United States Patent
Tsuchida et al.

(10) Patent No.: US 10,539,085 B2
(45) Date of Patent: Jan. 21, 2020

(54) DEVICE AND METHOD FOR CONTROLLING HYBRID VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Yasutaka Tsuchida, Toyota (JP); Shunya Kato, Seto (JP); Takuro Kumada, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/059,645

(22) Filed: Aug. 9, 2018

(65) Prior Publication Data

US 2019/0101074 A1    Apr. 4, 2019

(30) Foreign Application Priority Data

Sep. 29, 2017 (JP) .................. 2017-190084

(51) Int. Cl.
*F02D 41/04* (2006.01)
*B60W 20/40* (2016.01)
*F02P 5/15* (2006.01)

(52) U.S. Cl.
CPC ........... *F02D 41/042* (2013.01); *B60W 20/40* (2013.01); *F02P 5/15* (2013.01); *B60W 2510/0657* (2013.01); *B60W 2710/065* (2013.01)

(58) Field of Classification Search
CPC .... F02D 41/042; F02D 29/02; F02D 41/0002; F02P 5/15; B60W 20/40;
(Continued)

(56) References Cited

U.S. PATENT DOCUMENTS 3,800,759 A * 4/1974 Cedar ..................... F02D 37/02
                                                        123/339.11
7,159,561 B1 * 1/2007 Kerns .................... B60K 6/445
                                                        123/319

(Continued)

FOREIGN PATENT DOCUMENTS

JP          06241150 A  *  8/1994
JP       2003074404 A  *  3/2003
JP       2014-091366 A     5/2014

*Primary Examiner* — David Hamaoui
(74) *Attorney, Agent, or Firm* — Oliff PLC

(57) ABSTRACT

A pre-stoppage ignition control unit defines, as a stoppage transition air amount, an intake air amount of the engine with which the engine torque becomes the stoppage transition torque in a state in which an ignition timing of the engine is set to a predetermined self-sustaining operation ignition timing, defines, as an intermediate timing, a predetermined timing earlier than timing at which the intake air amount converges to the stoppage transition air amount during an execution period of the pre-stoppage self-sustaining operation control, sets the ignition timing of the engine in a period from the start of the pre-stoppage self-sustaining operation control to the intermediate timing to timing earlier than the self-sustaining operation ignition timing, and sets the ignition timing of the engine in the period after the intermediate timing to the self-sustaining operation ignition timing.

6 Claims, 3 Drawing Sheets

(58) Field of Classification Search
CPC ... B60W 2510/0657; B60W 2710/065; B60W 10/06; B60W 20/00
See application file for complete search history.

(56) References Cited

U.S. PATENT DOCUMENTS

| | | | | |
|---|---|---|---|---|
| 7,668,642 B2* | 2/2010 | Fuwa | ................... | F02D 41/042 123/179.4 |
| 8,645,013 B2* | 2/2014 | Sah | ....................... | B60W 10/08 701/22 |
| 8,676,478 B2* | 3/2014 | Nakai | .................. | B60W 10/06 701/112 |
| 9,027,680 B2* | 5/2015 | Sawada | ................. | B60K 6/445 180/65.28 |
| 2014/0336904 A1* | 11/2014 | Nakanishi | ............... | F02D 17/04 701/110 |

* cited by examiner

DEVICE AND METHOD FOR CONTROLLING HYBRID VEHICLE

BACKGROUND

The present disclosure relates to a device and method for controlling a hybrid vehicle.

In a hybrid vehicle, vehicle vibrations may occur due to a sudden change in the engine torque when the operating state of the engine shifts from a load operation to an operation stop (fuel cutoff). The vehicle vibrations can be reduced by performing a self-sustaining operation (idle operation) before the operating state of the engine shifts from the load operation to the operation stop to reduce a change in the engine torque at the time of stopping the operation.

In the engine of a hybrid vehicle, a normal self-sustaining operation is performed in a state in which the engine torque is kept substantially zero. Therefore, when the self-sustaining operation before stoppage of the operation (hereinafter, referred to as pre-stoppage self-sustaining operation) is performed under the same condition as that of the normal self-sustaining operation (idle operation), fuel is consumed only for the self-sustaining operation of the engine. Japanese Laid-Open Pant Publication No. 2014-091366 discloses a control device for a hybrid vehicle. In order to generate the engine output usable for power generation during the pre-stoppage self-sustaining operation, this control device sets the ignition timing during the pre-stoppage self-sustaining operation control to timing earlier than in the normal self-sustaining operation.

However, in the above case, the change in the torque generated at the time of stopping the operation of the engine increases by the torque generated by the advancement ignition of the ignition timing. Therefore, there is a risk that the vibration of the vehicle due to the stoppage of the operation of the engine is not sufficiently suppressed.

SUMMARY

An objective of the present disclosure is to provide a device and method for controlling a hybrid vehicle that can efficiently suppress vehicle vibrations caused by the stoppage of the operation of the engine.

To achieve the foregoing objective and in accordance with a first aspect of the present disclosure, a control device for a hybrid vehicle is provided. The hybrid vehicle includes an engine, which generates a driving force for traveling, and a generator motor drivingly coupled to the engine. The control device is configured to perform a pre-stoppage self-sustaining operation control, which stops operation of the engine after performing a self-sustaining operation of the engine until an engine torque decreases to a predetermined stoppage transition torque when stoppage of the operation of the engine is requested. The control device comprises a pre-stoppage ignition control unit, which is configured to: define, as a stoppage transition air amount, an intake air amount of the engine with which the engine torque becomes the stoppage transition torque in a state in which an ignition timing of the engine is set to a predetermined self-sustaining operation ignition timing; define, as an intermediate timing, a predetermined timing earlier than timing at which the intake air amount converges to the stoppage transition air amount during an execution period of the pre-stoppage self-sustaining operation control; set the ignition timing of the engine in a period from the start of the pre-stoppage self-sustaining operation control to the intermediate timing to timing earlier than the self-sustaining operation ignition timing; and set the ignition timing of the engine in the period from the intermediate timing to an end of the pre-stoppage self-sustaining operation control to the self-sustaining operation ignition timing.

To achieve the foregoing objective and in accordance with a second aspect of the present disclosure, a control device for a hybrid vehicle is provided. The hybrid vehicle includes an engine, which generates a driving force for traveling, and a generator motor drivingly coupled to the engine. The control device is configured to perform a pre-stoppage self-sustaining operation control, which stops operation of the engine after performing a self-sustaining operation of the engine until an engine torque decreases to a predetermined stoppage transition torque when stoppage of the operation of the engine is requested. The control device includes circuitry including a pre-stoppage ignition control unit, which is configured to: define, as a stoppage transition air amount, an intake air amount of the engine with which the engine torque becomes the stoppage transition torque in a state in which an ignition timing of the engine is set to a predetermined self-sustaining operation ignition timing; define, as an intermediate timing, a predetermined timing earlier than timing at which the intake air amount converges to the stoppage transition air amount during an execution period of the pre-stoppage self-sustaining operation control; set the ignition timing of the engine in a period from the start of the pre-stoppage self-sustaining operation control to the intermediate timing to timing earlier than the self-sustaining operation ignition timing; and set the ignition timing of the engine in the period from the intermediate timing to an end of the pre-stoppage self-sustaining operation control to the self-sustaining operation ignition timing.

To achieve the foregoing objective and in accordance with a third aspect of the present disclosure, a method for controlling a hybrid vehicle is provided. The hybrid vehicle includes an engine, which generates a driving force for traveling, and a generator motor drivingly coupled to the engine. The method includes: performing a pre-stoppage self-sustaining operation control, which stops the operation after performing a self-sustaining operation of the engine until an engine torque decreases to a predetermined stoppage transition torque when stoppage of the operation of the engine is requested; defining, as a stoppage transition air amount, an intake air amount of the engine with which the engine torque becomes the stoppage transition torque in a state in which an ignition timing of the engine is set to a predetermined self-sustaining operation ignition timing; defining, as an intermediate timing, a predetermined timing earlier than timing at which the intake air amount converges to the stoppage transition air amount during an execution period of the pre-stoppage self-sustaining operation control; setting the ignition timing of the engine in a period from the start of the pre-stoppage self-sustaining operation control to the intermediate timing to timing earlier than the self-sustaining operation ignition timing; and setting the ignition timing of the engine in the period from the intermediate timing to an end of the pre-stoppage self-sustaining operation control to the self-sustaining operation ignition timing.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION OF THE PREFERRED EMBODIMENTS

A hybrid vehicle according to one embodiment will now be described with reference to FIGS. 1 to 3.

Figure 1:
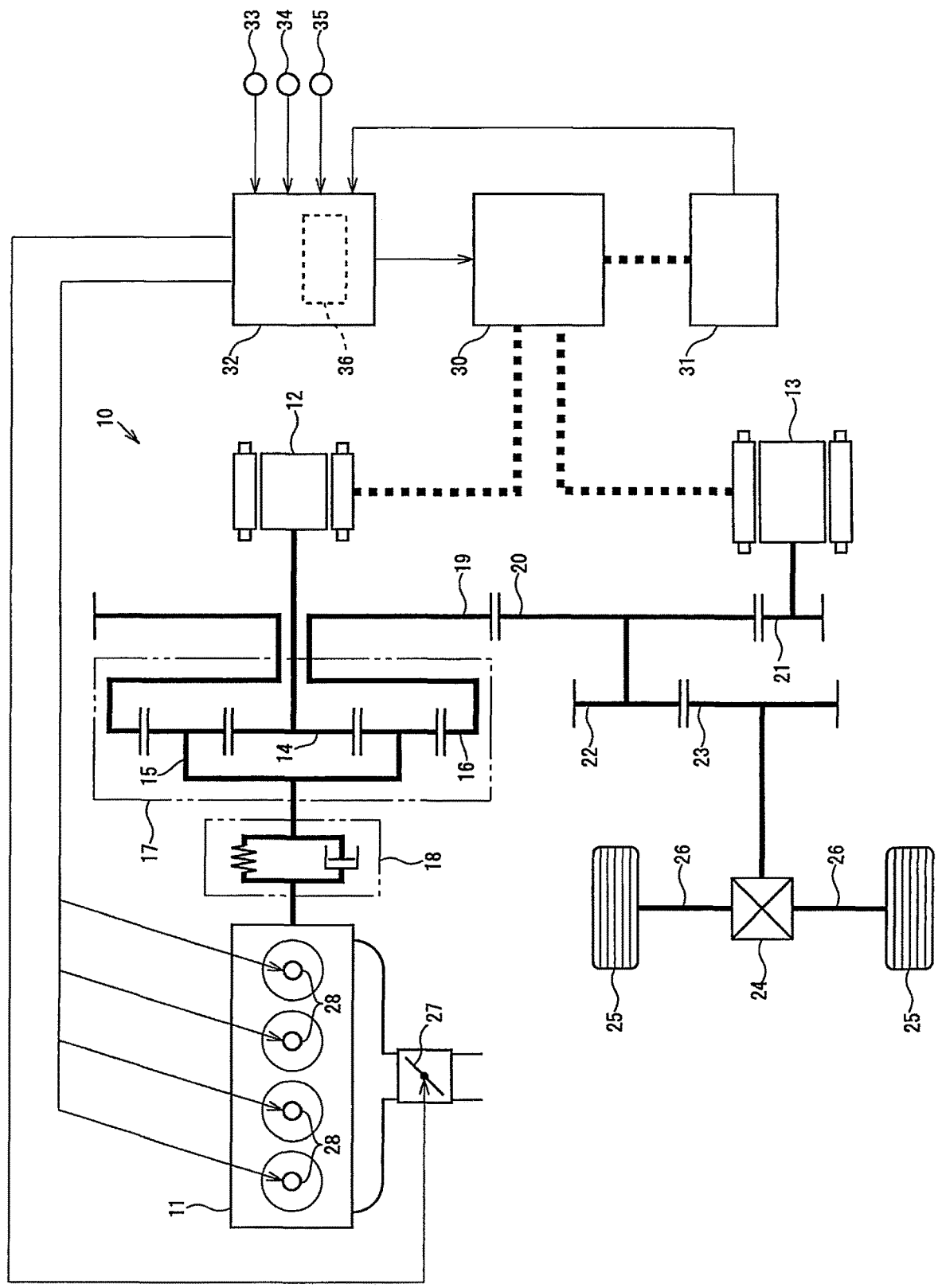
FIG. 1 is a schematic diagram illustrating a configuration of a control device for a hybrid vehicle according to one embodiment.
Figure 2:
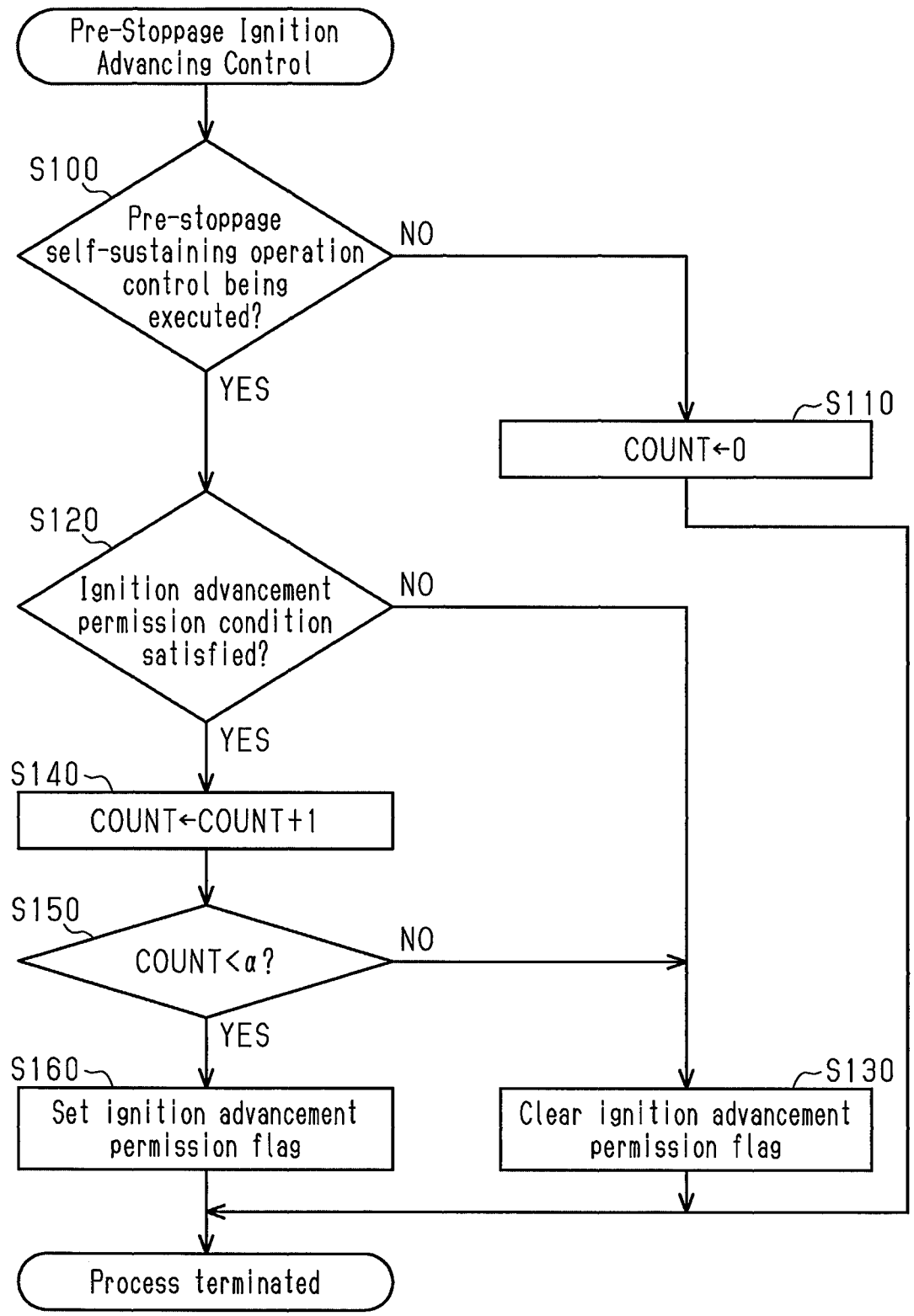
FIG. 2 is a flowchart of a pre-stoppage ignition control executed by a pre-stoppage ignition control unit of the control device.

As illustrated in FIG. 1, the hybrid vehicle includes a power unit 10 that generates a driving force to be transmitted to vehicle wheels 25. The power unit 10 includes, as two types of power sources, an engine 11, and two generator motors, which are a first generator motor 12 and a second generator motor 13. The engine 11 is provided with a throttle valve 27 for restricting intake air. Each cylinder of the engine 11 is provided with an ignition device 28.

The power unit 10 is provided with a planetary gear mechanism 17 having three rotational elements, which are a sun gear 14, a planetary carrier 15, and a ring gear 16. The planetary carrier 15 is connected to the engine 11 via a transaxle damper 18. The sun gear 14 is connected to the first generator motor 12. The ring gear 16 is integrated with a counter drive gear 19. The counter drive gear 19 is meshed with a counter driven gear 20. The second generator motor 13 is connected to a reduction gear 21 meshed with the counter driven gear 20. The counter driven gear 20 is connected to a final drive gear 22, so as to be integrally rotational. The final drive gear 22 is meshed with the final driven gear 23. The final driven gear 23 is connected to the wheel axles 26 of the two vehicle wheels 25 via a differential mechanism 24.

The first generator motor 12 and the second generator motor 13 are electrically connected to a battery 31 via an inverter 30. The inverter 30 adjusts the amount of electric power that is transferred between the first generator motor 12 and the battery 31, and the amount of electric power that is transferred between the second generator motor 13 and the battery 31.

The hybrid vehicle is provided with an electronic control unit 32 as a control device for the vehicle. Various sensors for detecting travelling conditions of the hybrid vehicle and the operating state of the driver, such as a vehicle speed sensor 33 for detecting the vehicle speed, an accelerator pedal sensor 34 for detecting the depression amount of an accelerator pedal (accelerator pedal depression degree), and a shift position sensor 35 for detecting the operation position (shift position) of the shift lever, are connected to the electronic control unit 32. Detection signals from the various sensors are input to the electronic control unit 32. The electronic control unit 32 determines a state of charge SOC of the battery 31 from the charging and discharging states of the battery 31. The state of charge SOC represents the ratio of the charging amount of the battery 31 to the maximum charging amount of the battery 31. The electronic control unit 32 performs the operating control of the engine 11. Further, the electronic control unit 32 performs the torque control of the first generator motor 12 and the second generator motor 13 by adjusting the electric power transfer amount between the first generator motor 12 and the second generator motor 13 and the battery 31, using the inverter 30.

The electronic control unit 32 is not limited to one that performs software processing on all processes executed by itself. For example, the electronic control unit 32 may be equipped with a dedicated hardware circuit (e.g., application specific integrated circuit: ASIC) that performs hardware processing on at least some of the processes to be executed by itself. That is, the electronic control unit 32 may be configured as 1) one or more processors that operate in accordance with a computer program (software), 2) one or more dedicated hardware circuits that execute at least some of the various processes, or 3) circuitry including combinations thereof. The processor includes a CPU and memories such as a RAM and a ROM, and the memory stores program codes or instructions configured to cause the CPU to execute the processing. The memories, that is, computer readable media, include any type of media that are accessible by general-purpose computers and dedicated computers.

Subsequently, a traveling control of the hybrid vehicle performed by the electronic control unit 32 will be described. First, the electronic control unit 32 calculates the torque to be transmitted from the power unit 10 to the wheel axle 26 during traveling of the vehicle as a target torque Te* on the basis of the accelerator pedal depression degree and the vehicle speed. Subsequently, the electronic control unit 32 calculates the product obtained by multiplying the target torque Te* by the rotational speed of the wheel axle 26, as the power (traveling power Pdrv*) that is transmitted from the power unit 10 to the wheel axle 26 during traveling of the vehicle. The rotational speed of the wheel axle 26 is determined from the rotational speed of the second generator motor 13, the vehicle speed, and the like. Further, the electronic control unit 32 calculates, from the state of charge SOC of the battery 31, the power of the power unit 10 distributed on the basis of charging and discharging for maintaining the state of charge SOC within an adequate range as a charging and discharging required power Pb*. The charging and discharging required power Pb* is calculated as a positive value when discharging of the battery 31 is required, and is calculated as a negative value when charging of the battery 31 is required.

Furthermore, the electronic control unit 32 sets the difference obtained by subtracting the charging and discharging required power Pb* from the traveling power Pdrv* as the value of a required power Pe*. The required power Pe* represents the power that needs to be transmitted to the wheel axle 26 by the engine 11. Further, the electronic control unit 32 calculates a target rotational speed Ne* and a target torque Te* corresponding to the engine speed and the engine torque, respectively, that can efficiently generate the power corresponding to the required power Pe*. The electronic control unit 32 performs the operating control of the engine 11 on the basis of the target rotational speed Ne* and the target torque Te*. That is, the electronic control unit 32 controls the opening degree of the throttle valve 27 such that an intake air amount suitable for operating the engine 11 with the target rotational speed Ne* and the target torque Te* is obtained. Further, the electronic control unit 32 determines a target ignition timing TF* from the target rotational speed Ne* and the target torque Te*, and controls the ignition device 28 on the basis of the target ignition timing TF*.

The value of the target ignition timing TF* is obtained as the timing obtained by retarding the advancement limit of the ignition timing in the current operating conditions of the engine by the amount of a reserve torque that enables a temporary torque increase due to an advancement of the ignition timing. The advancement limit of the ignition timing is set to the more retarded one of an optimal ignition timing, at which the combustion efficiency of the engine 11 becomes the maximum, and a knock limit ignition timing, which is the advancement limit of the ignition timing at which the occurrence of knocking is suppressed.

When the value of the required power Pe* of the engine 11 becomes equal to or lower than a predetermined operation stop determination value Pst, the electronic control unit 32 sets the value of the required power Pe* to zero. The target rotational speed Ne* at this time is set to a predetermined stoppage target rotational speed, which is set as the engine speed necessary for restarting the engine 11. The stoppage target rotational speed is set to an engine speed at which the engine 11 in a stopped state can be smoothly restarted.

On the other hand, the electronic control unit 32 performs a feedback control of a torque command value Tm1 of the first generator motor 12, so as to cause the engine speed to reach the target rotational speed Ne*. Further, the electronic control unit 32 calculates the torque transmitted from the first generator motor 12 driven on the basis of the torque command value Tm1 to the wheel axle 26. Further, the electronic control unit 32 calculates the difference obtained by subtracting the calculated value of the torque from the target torque Te* as a torque command value Tm2 of the second generator motor 13.

Pre-stoppage Self-Sustaining Operation Control

When the required power Pe* is set to zero in the traveling control described above, the operation of the engine 11 is stopped, and the motor traveling of the hybrid vehicle is performed by the first generator motor 12 and the second generator motor 13. At this time, the electronic control unit 32 executes the pre-stoppage self-sustaining operation control, in which the operation of the engine is stopped after performing the self-sustaining operation of the engine 11 until the engine torque decreases to a predetermined stoppage transition torque. In the present embodiment, the pre-stoppage self-sustaining operation control is executed until a predetermined time elapses from the time at which the required power Pe* is set to zero.

In the pre-stoppage self-sustaining operation control, by setting the target rotational speed Ne* to the above-described stoppage target rotational speed, and by setting the target torque Te* to the stoppage transition torque, the operating control of the engine 11 is performed. In this embodiment, the engine torque that is set as the stoppage transition torque is set to zero. The state in which the engine torque is zero represents a state in which the torque capable of being extracted to the outside, which is obtained by subtracting the loss amount such as friction from the torque generated by combustion, becomes zero.

When the pre-stoppage self-sustaining operation control is started, the opening degree of the throttle valve 27 is controlled to obtain an intake air amount suitable for the operation of the engine 11 (hereinafter, referred to as a stoppage transition air amount) in a state in which the engine speed is set to the stoppage target rotational speed and the engine torque is set to the stoppage transition torque. The pre-stoppage self-sustaining operation control is performed until the intake air amount converges to the stoppage transition air amount. At this time, the opening degree control of the throttle valve 27 is performed on the assumption that the ignition timing is controlled on the basis of the target ignition timing TF* determined by setting the target rotational speed Ne* to the stoppage target rotational speed and by setting the target torque Te* to the stoppage transition torque. Therefore, in a case where the ignition timing at the time when the intake air amount converges to the stoppage transition air amount is earlier than the target ignition timing TF*, the pre-stoppage self-sustaining operation control is terminated, while maintaining the engine torque greater than the stoppage transition torque.

The time required until the intake air amount converges to the stoppage transition air amount varies depending on the operating conditions of the engine 11 before the start of the pre-stoppage self-sustaining operation control. Therefore, in the present embodiment, the predetermined time for executing the pre-stoppage self-sustaining operation control is set to a time equal to or longer than the maximum value of the change range of the required time.

Pre-Stoppage Ignition Control

The electronic control unit 32 includes a pre-stoppage ignition control unit 36 as a control structure for controlling the ignition timing of the engine 11 during the pre-stoppage self-sustaining operation control. Hereinafter, a control of the ignition timing during the pre-stoppage self-sustaining operation control will be described with reference to FIG. 2. A process of the pre-stoppage ignition control routine illustrated in FIG. 2 is repeatedly executed at every predetermined control cycle.

First, in step S100, a pre-stoppage ignition control unit 36 determines whether the pre-stoppage self-sustaining operation control is being executed. If the pre-stoppage self-sustaining operation control is not being executed (step S100: NO), the pre-stoppage ignition control unit 36 advances the process to step S110. Further, in step S110, the pre-stoppage ignition control unit 36 resets the value of the elapsed time counter COUNT to zero, and then terminates the current routine.

If the pre-stoppage self-sustaining operation control is being executed (S100: YES), the pre-stoppage ignition control unit 36 advances the process to step S120 to determine whether the ignition advancement permission condition is satisfied or not. The ignition advancement permission condition is satisfied when charging to the battery 31 is allowable. Whether or not the charging to the battery 31 is allowable is determined on the basis of the state of charge SOC of the battery 31 or an input limit value Win, which is the upper limit value of the charging amount of the battery 31 determined from the temperature of the battery 31.

If the ignition advancement permission condition is not satisfied (S120: NO), the pre-stoppage ignition control unit 36 advances the process to step S130, clears the ignition advancement permission flag, and then terminates the present routine. When the ignition advancement permission flag is cleared during the pre-stoppage self-sustaining operation control, the pre-stoppage ignition control unit 36 controls the ignition device 28 such that the ignition is performed at the target ignition timing TF* determined from the target rotational speed Ne* and the target torque Te*. The ignition timing during the pre-stoppage self-sustaining operation control, which is set to the target ignition timing TF*, is referred to as a self-sustaining operation ignition timing FIDL.

If the ignition advancement permission condition is satisfied (S120: YES), the pre-stoppage ignition control unit 36 advances the process to step S140 and adds 1 to the value of the elapsed time counter COUNT. In step S150, the pre-stoppage ignition control unit 36 determines whether or not the value of the elapsed time counter COUNT after the increment is less than a predetermined value α. When the value of the elapsed time counter COUNT is equal to or greater than the predetermined value α (S150: NO), the pre-stoppage ignition control unit 36 advances the process to step S130.

When the value of the elapsed time counter COUNT is less than the predetermined value α (S150: YES), the pre-stoppage ignition control unit 36 advances the process to step S160. Further, in step S160, the pre-stoppage ignition control unit 36 sets the ignition advancement permission flag, and then terminates the current routine. When the ignition advancement permission flag is set during the pre-stoppage self-sustaining operation control, the pre-stoppage ignition control unit 36 controls the ignition device 28 so that the ignition is performed at the timing advanced from the target ignition timing TF*. At this time, the ignition timing is set to the timing earlier than the self-sustaining operation ignition timing FIDL. The ignition timing during the pre-stoppage self-sustaining operation control, which is set to the timing earlier than the self-sustaining operation ignition timing FIDL, is referred to as an advancement ignition timing FADV.

In this routine, the value of the elapsed time counter COUNT is cleared to zero except during the execution of the pre-stoppage self-sustaining operation control. While the pre-stoppage self-sustaining operation control is being executed, 1 is added to the value of the elapsed time counter COUNT each time the process of this routine is executed at a predetermined control cycle. The value of the elapsed time counter COUNT represents the elapsed time from the start of the pre-stoppage self-sustaining operation control.

Further, in this routine, the ignition advancement permission flag is set when the value of the elapsed time counter COUNT is less than the predetermined value α, and the ignition advancement permission flag is cleared when the value of the elapsed time counter COUNT is equal to or greater than the predetermined value α. That is, the ignition advancement permission flag is set until a certain time elapses from the start of the pre-stoppage self-sustaining operation control, and is cleared after the certain time has elapsed. The value of the predetermined value α is set such that the value of the elapsed time counter COUNT reaches a predetermined value α at the time shorter than the minimum value of the required time from the start of the pre-stoppage self-sustaining operation control to the convergence of the intake air amount to the stoppage transition air amount. Therefore, the timing at which the ignition advancement permission flag is switched from the set state to the cleared state is set to a predetermined timing (intermediate timing) earlier than the timing at which the intake air amount converges to the stoppage transition air amount during the execution period of the pre-stoppage self-sustaining operation control.

Subsequently, the operational advantages of the control device for the hybrid vehicle of the present embodiment will be described with reference to FIG. 3.

Figure 3:
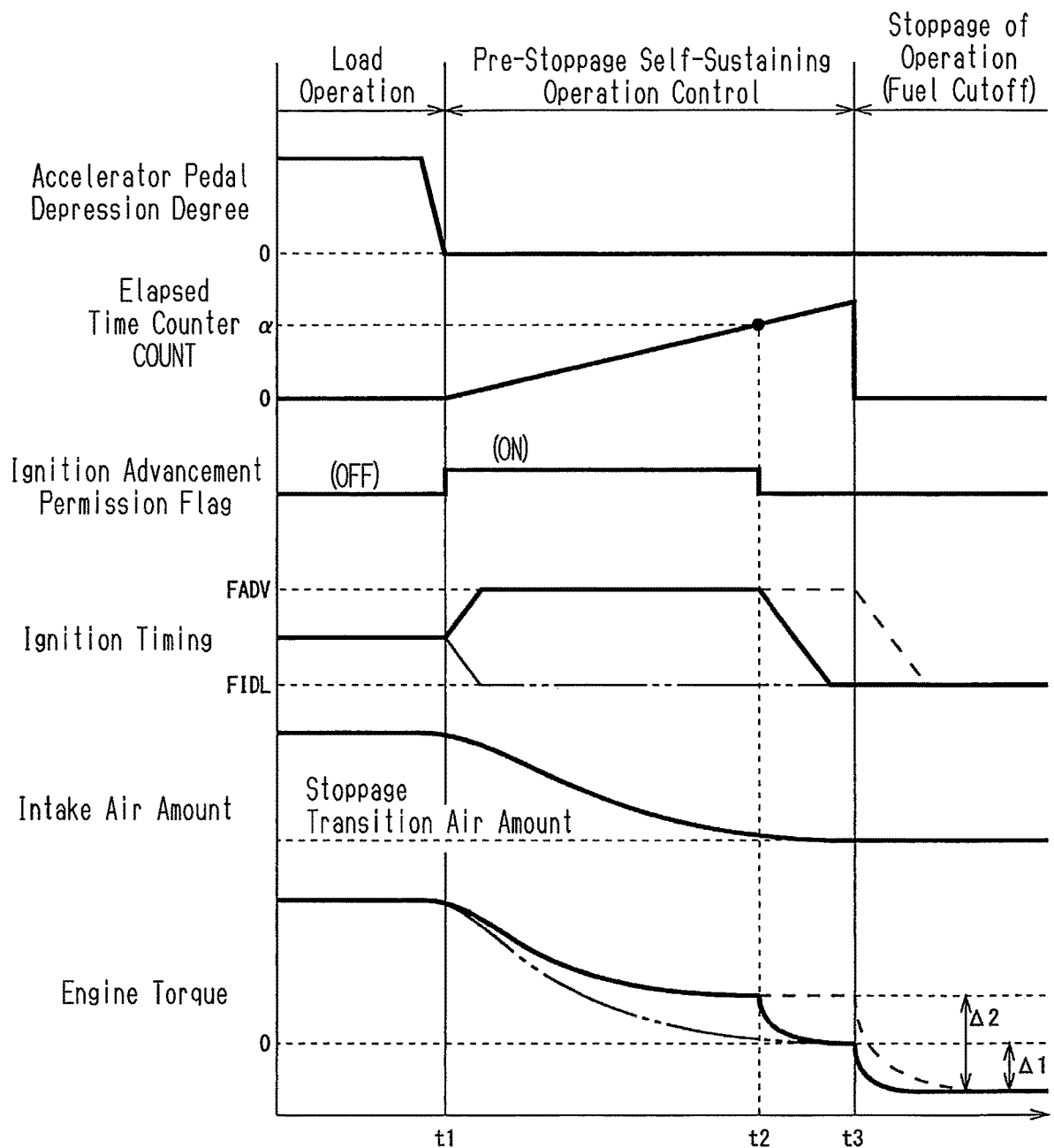
FIG. 3 is a timing diagram illustrating an example of a manner in which pre-stoppage self-sustaining operation control is executed.

A long dashed double-short dashed line of FIG. 3 illustrates the movements of the ignition timing and the engine torque of Comparative Example 1, in which the ignition timing is controlled to the self-sustaining operation ignition timing FIDL over the entire period during the pre-stoppage self-sustaining operation control. A broken line of FIG. 3 illustrates the movements of the ignition timing and the engine torque of Comparative Example 2, in which the ignition timing is controlled to the advancement ignition timing FADV over the entire period of the pre-stoppage self-sustaining operation control.

When the accelerator pedal depression degree becomes zero at point in time t1, the required power Pe* of the engine 11 is set to zero, and the pre-stoppage self-sustaining operation control is started. When the pre-stoppage self-sustaining operation control is started, the target rotational speed Ne* of the engine 11 is set to the stoppage target rotational speed and the target torque Te* is set to the stoppage transition torque (0), thereby performing the traveling control of the hybrid vehicle. As a result, the torque control of the first generator motor 12 is performed so as to cause the engine speed to reach the stoppage target rotational speed. Further, the opening degree of the throttle valve 27 is controlled so as to cause the intake air amount of the engine 11 to reach the stoppage transition air amount. As a result, after the point in time t1, the intake air amount of the engine 11 decreases, the intake air amount converges to the stoppage transition air amount at the point in time t3, the pre-stoppage self-sustaining operation control terminates, and the process shifts to the stoppage of the operation of the engine 11. After stopping the operation, the engine 11 is rotated by an input from the outside (the drive wheel axle 26, the first generator motor 12, and/or the second generator motor 13). If the engine torque at the time of load operation is a positive value, the engine torque after the stoppage of operation becomes a negative value.

The stoppage transition air amount is an intake air amount when the self-sustaining operation of the engine 11 for achieving the stoppage transition torque is implemented in the state in which the ignition timing is controlled to the self-sustaining operation ignition timing FIDL and the engine speed is the stoppage target rotational speed. Therefore, if the ignition timing is controlled to the target ignition timing TF* at the point in time t3 when the intake air amount converges to the stoppage transition air amount, the engine torque decreases to the stoppage transition torque (0) at that time.

In the case of Comparative Example 1 indicated by the long dashed double-short dashed line of FIG. 3, the ignition timing is controlled to the self-sustaining operation ignition timing FIDL over the entire period during the pre-stoppage self-sustaining operation control. Therefore, the engine torque decreases to the stoppage transition torque (0 in the present embodiment) at the point in time t3. In FIG. 3, Δ1 is the amount of change in the engine torque in association with the stoppage of the operation in the case of Comparative Example 1.

In the case of Comparative Example 2 indicated by the broken line in FIG. 3, the ignition timing is controlled to the advancement ignition timing FADV earlier than the self-sustaining operation ignition timing FIDL throughout the period during the pre-stoppage self-sustaining operation control. If the ignition timing is advanced within a range that does not exceed the optimal ignition timing, the combustion efficiency rises and the engine torque increases. Therefore, in the case of Comparative Example 2, the engine torque during the pre-stoppage self-sustaining operation control becomes greater than that in the case of Comparative Example 1. Further, during the pre-stoppage self-sustaining operation control, a torque control of the first generator motor 12 is performed so as to set the engine speed to the stoppage target rotational speed. At this time, regenerative torque greater than that in the case of Comparative Example 1 is generated as the engine torque during the pre-stoppage self-sustaining operation control is great. That is, in the case of Comparative Example 2, it is possible to increase the power generation amount of the first generator motor 12 without increasing the fuel consumption of the engine 11 during the pre-stoppage self-sustaining operation control, as compared with the case of Comparative Example 1. However, in the case of Comparative Example 2, the engine torque at the point in time t3 when the intake air amount converges to the stoppage transition air amount becomes greater than the stoppage transition torque. Therefore, in the case of Comparative Example 2, the change amount Δ2 of the engine torque caused by the stoppage of the operation is greater than that in the case of Comparative Example 1. Even when the ignition timing is changed from the point in time t3, at which the intake air amount converges to the stoppage transition air amount to the self-sustaining operation ignition timing FIDL, the engine torque remains in a state greater than the stoppage transition torque until there is no residual torque due to inertia. Therefore, even after the convergence of the intake air amount to the stoppage transition air amount, the pre-stoppage self-sustaining operation control needs to be continued. For this reason, the fuel consumption is increased as stoppage of the operation of the engine is delayed.

In contrast, in the case of the present embodiment, the ignition timing is controlled to the advancement ignition timing FADV during the period from the point in time t1, at which the pre-stoppage self-sustaining operation control is started, to the point in time t2, at which the value of the elapsed time counter COUNT reaches the predetermined value α. Therefore, the power generation amount of the first generator motor 12 during this period is greater than in the case of Comparative Example 1. On the other hand, from the point in time t2, the pre-stoppage self-sustaining operation control is performed by controlling the ignition timing to the self-sustaining operation ignition timing FIDL. As described above, the value of the predetermined value α is set such that the value of the elapsed time counter COUNT reaches the predetermined value α at the predetermined timing (intermediate timing) earlier than the timing at which the intake air amount converges to the stoppage transition air amount during the execution period of the pre-stoppage self-sustaining operation control. That is, in the present embodiment, the ignition timing of the engine 11 in the period from the start of the pre-stoppage self-sustaining operation control to the intermediate timing is set to the timing earlier than the self-sustaining operation ignition timing FIDL, and the ignition timing of the engine 11 in the period from the intermediate timing to the end of the pre-stoppage self-sustaining operation control is set to the self-sustaining operation ignition timing FIDL. Therefore, at the point in time t3, when the intake air amount converges to the stoppage transition air amount, the engine torque is reduced to the stoppage transition torque. As described above, in the present embodiment, it is possible to increase the power generation amount of the first generator motor 12 during the pre-stoppage self-sustaining operation control as compared with the case of Comparative Example 1, while making the torque step of the engine 11 generated at the time of stopping the operation equivalent to that of the case of Comparative Example 1. Therefore, it is possible to efficiently suppress the vehicle vibrations caused by the stoppage of the operation of the engine 11.

Further, according to the present embodiment, in a state in which charging to the battery 31 is allowable, only when the pre-stoppage advancement permission condition is satisfied, the ignition timing in the period up to the intermediate timing during the pre-stoppage self-sustaining operation control is controlled to the advancement ignition timing FADV. That is, when the charging of the battery 31 is restricted, the ignition timing is controlled to the self-sustaining operation ignition timing FIDL over the entire period during the pre-stoppage self-sustaining operation control. Therefore, overcharging of the battery 31 can be suppressed.

The above-described embodiment may be modified as follows.

In the above-described embodiment, the timing (intermediate timing) at which the ignition timing during the pre-stoppage self-sustaining operation control is switched from the advancement ignition timing FADV to the self-sustaining operation ignition timing FIDL is determined from the elapsed time from the start of the pre-stoppage self-sustaining operation control indicated by the value of the elapsed time counter COUNT. However, the intermediate timing may be determined from other parameters such as the intake air amount. For example, the intake air amount greater than the stoppage transition air amount is set as the determination value, and the intermediate timing may be determined on the basis of the fact that the intake air amount has decreased to the determination value.

In the above-described embodiment, the termination timing of the pre-stoppage self-sustaining operation control is determined by the elapsed time from the start of the control. That is, the execution period of the pre-stoppage self-sustaining operation control is set to a fixed time. However, the termination timing of the control may be determined on the basis of the intake air amount or the like, without fixing the execution period of the pre-stoppage self-sustaining operation control. For example, the pre-stoppage self-sustaining operation control may be terminated on the basis of the fact that the intake air amount has decreased to the pre-stoppage transition air amount.

Although, in the above-described embodiment, the value of the stoppage transition torque is zero, it may be greater than zero as long as the vehicle vibrations at the time of stopping the operation of the engine 11 can be suppressed.

Although, in the above-described embodiment, the requirement for satisfying the ignition advancement permission condition is set as the condition that the charging to the battery 31 is allowable, the contents of the ignition advancement permission condition may be changed as appropriate.

The control device of the above-described embodiment is applied to a hybrid vehicle including the planetary gear mechanism 17, in which three rotational elements of the sun gear 14, the planetary carrier 15 and the ring gear 16 are drivingly coupled to the engine 11, the first generator motor 12 and the wheel axle 26, respectively. However, the control device of the above-described embodiment may be applied to a hybrid vehicle that does not include the planetary gear mechanism 17.

Therefore, the present examples and embodiments are to be considered as illustrative and not restrictive and the disclosure is not to be limited to the examples and embodiments given herein.

The invention claimed is:
1. A control device for a hybrid vehicle, the hybrid vehicle including an engine, which generates a driving force for traveling, and a generator motor drivingly coupled to the engine, wherein
the control device is configured to perform a pre-stoppage self-sustaining operation control, which stops operation of the engine after performing a self-sustaining operation of the engine until an engine torque decreases to a predetermined stoppage transition torque when stoppage of the operation of the engine is requested, and
the control device comprises a pre-stoppage ignition control unit, which is configured to define, as a stoppage transition air amount, an intake air amount of the engine with which the engine torque becomes the stoppage transition torque in a state in which an ignition timing of the engine is set to a predetermined self-sustaining operation ignition timing, define, as an intermediate timing, a predetermined timing earlier than timing at which the intake air amount converges to the stoppage transition air amount during an execution period of the pre-stoppage self-sustaining operation control, set the ignition timing of the engine in a period from the start of the pre-stoppage self-sustaining operation control to the intermediate timing to timing earlier than the self-sustaining operation ignition timing, and set the ignition timing of the engine in the period from the intermediate timing to an end of the pre-stoppage self-sustaining operation control to the self-sustaining operation ignition timing.

2. The control device for a hybrid vehicle according to claim 1, wherein the pre-stoppage ignition control unit is configured to set the intermediate timing to timing at which an elapsed time from the start of the pre-stoppage self-sustaining operation control reaches a predetermined time.

3. The control device for a hybrid vehicle according to claim 1, wherein the pre-stoppage ignition control unit is configured to set the self-sustaining operation ignition timing to the ignition timing in a period from the start of the pre-stoppage self-sustaining operation control to the intermediate timing when charging of a battery that transfers electric power with the generator motor is restricted.

4. The control device for a hybrid vehicle according to claim 1, wherein the hybrid vehicle includes a planetary gear mechanism in which three rotational elements are drivingly coupled to the engine, the generator motor, and a wheel axle, respectively.

5. A control device for a hybrid vehicle, the hybrid vehicle including an engine, which generates a driving force for traveling, and a generator motor drivingly coupled to the engine, wherein the control device is configured to perform a pre-stoppage self-sustaining operation control, which stops operation of the engine after performing a self-sustaining operation of the engine until an engine torque decreases to a predetermined stoppage transition torque when stoppage of the operation of the engine is requested, and the control device comprises circuitry including a pre-stoppage ignition control unit, which is configured to define, as a stoppage transition air amount, an intake air amount of the engine with which the engine torque becomes the stoppage transition torque in a state in which an ignition timing of the engine is set to a predetermined self-sustaining operation ignition timing, define, as an intermediate timing, a predetermined timing earlier than timing at which the intake air amount converges to the stoppage transition air amount during an execution period of the pre-stoppage self-sustaining operation control, set the ignition timing of the engine in a period from the start of the pre-stoppage self-sustaining operation control to the intermediate timing to timing earlier than the self-sustaining operation ignition timing, and set the ignition timing of the engine in the period from the intermediate timing to an end of the pre-stoppage self-sustaining operation control to the self-sustaining operation ignition timing.

6. A method for controlling a hybrid vehicle, the hybrid vehicle including an engine, which generates a driving force for traveling, and a generator motor drivingly coupled to the engine, the method comprising:

performing a pre-stoppage self-sustaining operation control, which stops the operation after performing a self-sustaining operation of the engine until an engine torque decreases to a predetermined stoppage transition torque when stoppage of the operation of the engine is requested;

defining, as a stoppage transition air amount, an intake air amount of the engine with which the engine torque becomes the stoppage transition torque in a state in which an ignition timing of the engine is set to a predetermined self-sustaining operation ignition timing;

defining, as an intermediate timing, a predetermined timing earlier than timing at which the intake air amount converges to the stoppage transition air amount during an execution period of the pre-stoppage self-sustaining operation control;

setting the ignition timing of the engine in a period from the start of the pre-stoppage self-sustaining operation control to the intermediate timing to timing earlier than the self-sustaining operation ignition timing; and setting the ignition timing of the engine in the period from the intermediate timing to an end of the pre-stoppage self-sustaining operation control to the self-sustaining operation ignition timing.

* * * * *